(12) United States Patent
Williams et al.

(10) Patent No.: US 10,493,392 B2
(45) Date of Patent: Dec. 3, 2019

(54) AIR FILTER

(71) Applicant: K&N Engineering, Inc., Riverside, CA (US)

(72) Inventors: Steve Williams, Cherry Valley, CA (US); Jere James Wall, Helendale, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 16/003,645

(22) Filed: Jun. 8, 2018

(65) Prior Publication Data

US 2018/0290092 A1 Oct. 11, 2018

Related U.S. Application Data

(63) Continuation of application No. 15/053,300, filed on Feb. 25, 2016, now Pat. No. 10,010,823, which is a continuation of application No. 14/213,408, filed on Mar. 14, 2014, now Pat. No. 9,283,506.

(60) Provisional application No. 61/794,421, filed on Mar. 15, 2013.

(51) Int. Cl.
| | |
|---|---|
| *B01D 46/00* | (2006.01) |
| *B01D 46/24* | (2006.01) |
| *B01D 46/14* | (2006.01) |
| *B01D 46/52* | (2006.01) |

(52) U.S. Cl.
CPC ......... *B01D 46/0005* (2013.01); *B01D 46/14* (2013.01); *B01D 46/2411* (2013.01); *B01D 46/2414* (2013.01); *B01D 46/521* (2013.01); *B01D 2271/02* (2013.01); *B01D 2271/022* (2013.01); *B01D 2271/027* (2013.01)

(58) Field of Classification Search
CPC ............ B01D 46/0005; B01D 46/2411; B01D 46/2414; B01D 46/521; B01D 2271/02; B01D 2271/022; B01D 2271/027; B01D 2201/291

See application file for complete search history.

(56) References Cited

U.S. PATENT DOCUMENTS

| | | |
|---|---|---|
| 5,954,849 A | 9/1999 | Berkhoel |
| 6,638,332 B1 | 10/2003 | Schmitz et al. |
| 7,294,162 B2 | 11/2007 | Anderson et al. |
| 9,283,506 B2 | 3/2016 | Williams et al. |
| 10,010,823 B2 * | 7/2018 | Williams ........... B01D 46/0005 |
| 2002/0162309 A1 | 11/2002 | Schmitz et al. |
| 2004/0065602 A1 | 4/2004 | Moscaritolo et al. |
| 2005/0126138 A1 | 6/2005 | Anderson et al. |
| 2005/0178716 A1 | 8/2005 | Suri |
| 2005/0229563 A1 | 10/2005 | Holzmann |
| 2007/0113529 A1 | 5/2007 | Gierer |

(Continued)

*Primary Examiner* — Robert Clemente
(74) *Attorney, Agent, or Firm* — Rutan & Tucker LLP; Hani Z. Sayed

(57) ABSTRACT

An air filter including two opposing open ends, and a filter area circumferentially enclosing a cavity in between. The first open end frictionally and sealingly engages the filter housing including an air port, while the second end engages the housing to close the second end from passage of air. The filter area may be reinforced to provide a durable, reusable filter. The filter material may be selected to provide depth loading and increase the particulate capacity of the filter.

22 Claims, 5 Drawing Sheets

(56) References Cited

U.S. PATENT DOCUMENTS

2008/0041026 A1     2/2008   Engel et al.
2009/0178962 A1     7/2009   Ahuja et al.

\* cited by examiner

AIR FILTER

CROSS REFERENCE TO RELATED APPLICATION

The present continuation application claims priority to U.S. patent application Ser. No. 15/053,300 filed on Feb. 25, 2016 and U.S. patent application Ser. No. 14/213,408, filed on Mar. 14, 2014 now issued as U.S. Pat. No. 9,283,506 date Mar. 15, 2016 and U.S. Provisional Application No. 61/794, 421, filed Mar. 15, 2013 and titled "Air Filter," which is incorporated in its entirety herein.

FIELD OF THE INVENTION

The field of the invention is generally related to filter devices. More specifically, the field of the invention is related to vehicle air filters.

BACKGROUND

An air filter designed to remove particulate is generally a device composed of fibrous materials. These fibrous materials may remove solid particulates such as dust, pollen, mold, and bacteria from the air. Air filters are used in applications where air quality is important, notably in building ventilation systems and in engines.

Air filters may be used in automobiles, trucks, tractors, locomotives and other vehicles that use internal combustion engines. Air filters may be used with gasoline engines, diesel engines, or other engines that run on fossil fuels or other combustible substances. Air filters may be used with engines in which combustion is intermittent, such as four-stroke and two-stroke piston engines, as well as other types of engines that take in air so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally the air intakes of internal combustion engines and compressors tend to use either: paper, foam, or cotton filters. Some filters use an oil bath. Air filters for internal combustion engines prevent abrasive particulate matter from entering the engine's cylinders, where it would cause mechanical wear and oil contamination. In many fuel injected engines, a flat panel pleated paper filter element may be used. This filter is usually placed inside a plastic box connected to the throttle body with ductwork. Vehicles that use carburetors or throttle body fuel injection typically use a cylindrical air filter positioned above the carburetor or throttle body.

Air filters may also be used to filter cabin air, for example, air within a vehicle such as a car, truck, airplane, bus, train, tractor, etc. These air filters may typically be a pleated-paper filter in which outside-air is passed through the filters before entering the vehicle's passenger compartment. Some of these filters are rectangular and similar in shape to the combustion air filter.

SUMMARY OF THE INVENTION

The present invention provides an air filter. Additionally, the present invention may provide an air filter system and methods of using the air filter.

Embodiments as described herein may include an air filter with a first end, a second end, and a filter material between the first end and a second end. The first and second end may be open, while the filter material may fully circumscribe and surround the respective ends, thus creating a filter having a cylindrical outer profile and a passage longitudinally therethrough. One end may be configured to accept an air flow conduit, thus forcing air into or removing air from the interior passage. The opposing end may be configured to sealingly engage a filter housing, such that air is not permitted to pass therethrough, but is instead forced through the filter material. The ends are shaped such that they create the requisite sealing engagement with the respective surfaces without requiring additional sealing gaskets, or components. The ends are configured to conform and/or deform to the surfaces such that a frictional, sealing engagement is created. Therefore, the engagement both maintains the filter in the desired location as well as provides the necessary connections to direct the air through the filter system. The ends may also configured to maintain the sealing engagement during deformation of the ends through thermal expansion and contraction.

To this end, in an exemplary embodiment, an air filter, comprising: a first end cap at a first terminal end of the air filter, the first end cap having a first opening; a second end cap at a second terminal end of the air filter opposite the first terminal end, the second end cap having a second opening; and a filter media coupled to and sealed between the first end and the second end to circumferentially surround an interior cavity.

In an exemplary embodiment, comprising a rim defining the first opening and extending longitudinally past an exterior terminal end of the first end cap.

In an exemplary embodiment, wherein an interior surface of the rim defining the first opening is tapered such that an interior diameter at a terminal edge of the end cap away from the filter media is greater than an interior diameter along the interior surface away from the terminal edge.

In an exemplary embodiment, wherein the tapered interior surface is accurate.

In an exemplary embodiment, further comprising a flange circumferentially surrounding a longitudinal portion of the rim extending longitudinally past a terminal end of an exterior perimeter of the first end cap.

In an exemplary embodiment, wherein the flange projects radially inwardly.

In an exemplary embodiment, wherein the second end cap comprises an interior rim defining the second opening and projecting longitudinally outwardly from an terminal end of a portion of the second end cap.

In an exemplary embodiment, wherein the second end cap comprises an exterior rim defining an exterior perimeter of the second end projecting longitudinally outward from the terminal end of the portion of the second end cap, such that a radial gap separates the interior rim from the exterior rim.

In an exemplary embodiment, wherein an interior surface of the interior rim comprises a circumferential ridge around the first opening.

In an exemplary embodiment, wherein a material of the first end is configured to deform when mated with a filter housing.

In an exemplary embodiment, wherein a material of the second end is configured to deform when mated with a filter housing.

Various objects, features, aspects and advantages of the present invention will become more apparent from the following detailed description of preferred embodiments of

BRIEF DESCRIPTION OF THE DRAWING

It will be understood that the terms "top," "side," and "bottom" used to describe FIGS. 1-6 are intended to provide a frame of reference for purposes of describing embodiments of the air filter. The actual orientation of the air filter in use and the direction of air flow may vary.

DETAILED DESCRIPTION OF THE EMBODIMENTS

In the following description of preferred embodiments, reference is made to the accompanying drawings which form a part hereof, and in which it is shown by way of illustration of specific embodiments in which the invention can be practiced. It is to be understood that other embodiments can be used and structural changes can be made without departing from the scope of the embodiments of this invention.

Although embodiments of the invention may be described and illustrated herein in terms of a single example air filter, it should be understood that embodiments of this invention are not limited to the exact shape illustrated, but rather, include a wide variety of generally cylindrical shapes, generally circular, oval, round, curved, or other closed perimeter shape, that provides a relatively large surface area in a given volume of the filter.

Figure 1:
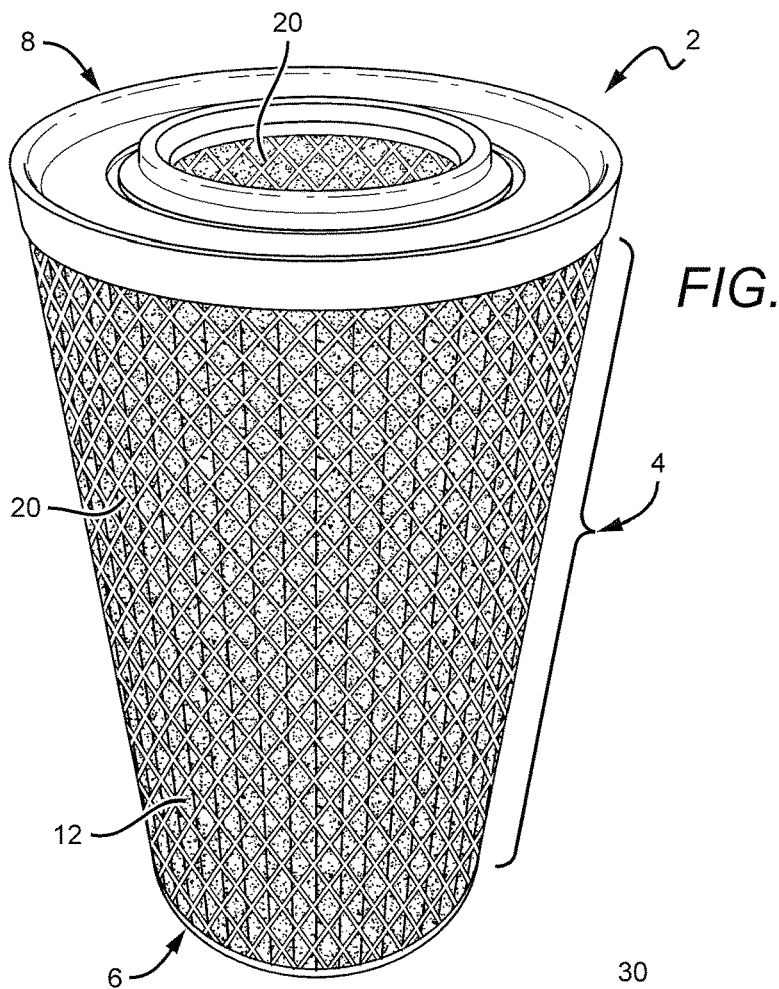
FIG. 1 illustrates a perspective view of an exemplary air filter according to embodiments described herein.

According to embodiments as described herein, an exemplary air filter 2 has a filter area 4, a first end 6, and a second end 8. As shown in FIG. 1, the filter area 4 is composed of a filter material 12 that circumferentially surrounds an open interior cavity 10 such that the filter material 12 creates an exterior perimeter of at least a portion of the cavity. The exterior shape may be generally circular, oval, conical, or otherwise shaped to improve the surface area available for air flow passage for a given volume. The shape may be consistent along a longitudinal length or may vary along the length. For example, the outer profile may taper from one end to the other. The length of the filter material 12 in the circumferential direction may be longer than the circular circumference of the filter generally, such that the surface area of the filter material is greater than the profile surface area of the filter.

The filter area 4 provides an area to pass an air stream and trap particulates and other contaminates. The filter material may be paper, foam, cotton, spun fiberglass, or other known filter materials, woven or non-woven material, synthetic or natural, or any combination thereof. The filter material may be pleated or otherwise shaped or contoured to increase a surface area for passing the air stream to be cleaned.

Figure 5:
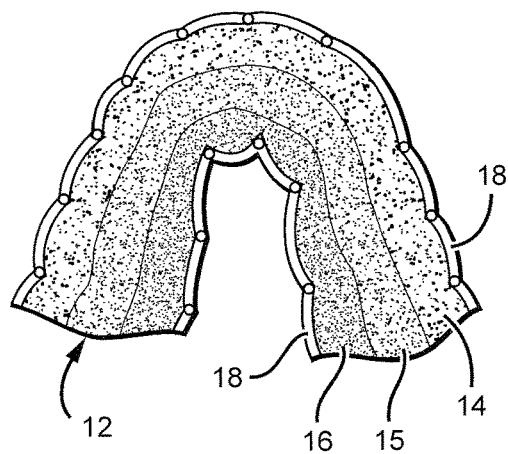
FIG. 5 illustrates an exemplary embodiment of the air filter medium.
Figure 4:
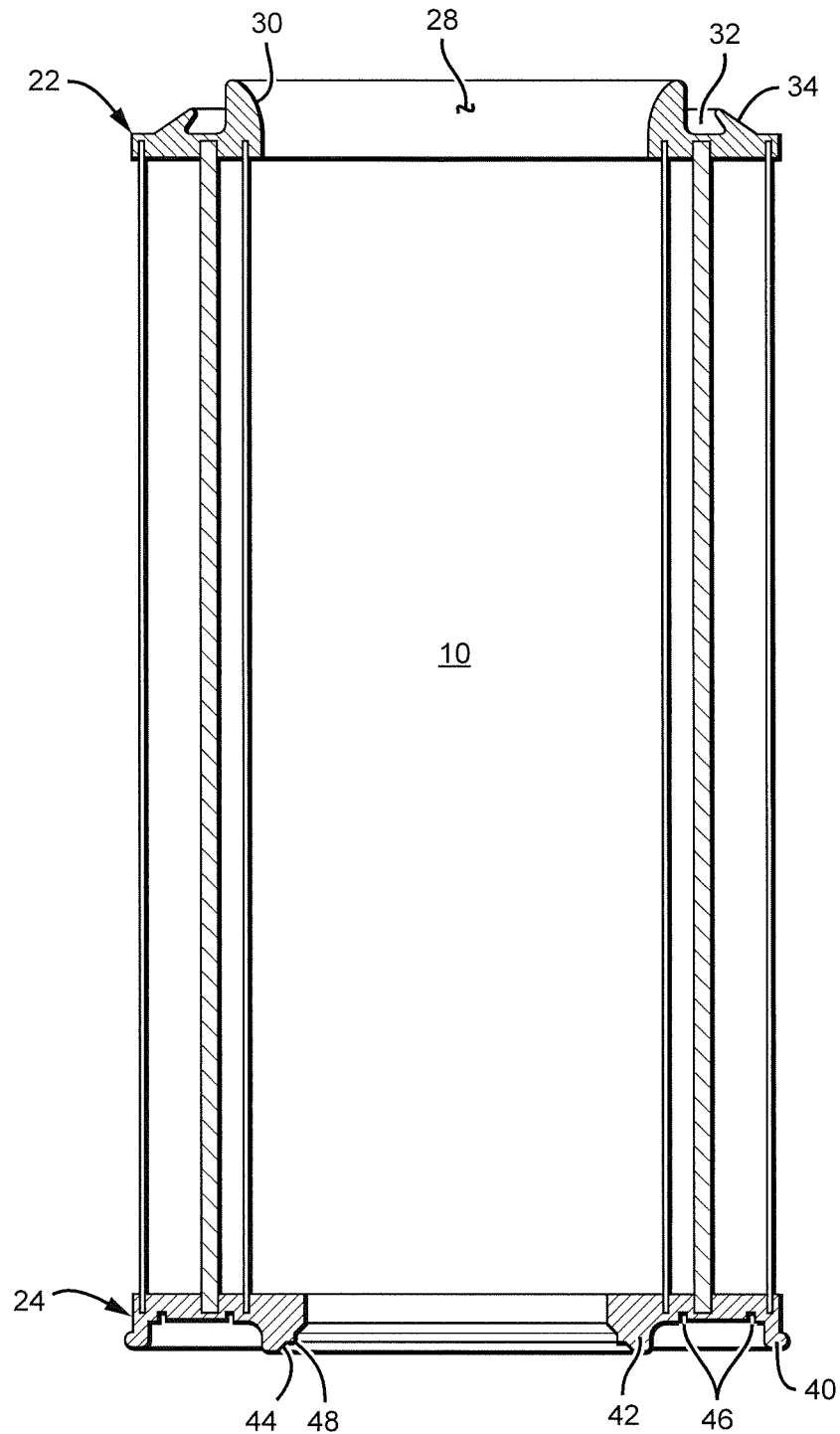
FIG. 4 illustrates a cross-sectional cut away side view according to embodiments described herein.

In an exemplary embodiment, the filter material 12 includes a combination of materials to create a hybrid filter medium. The hybrid air filtration medium is a non-woven synthetic material designed to be used dry with no oil required. Many non-woven mediums have a two-dimensional or "flat" surface. The hybrid filter media according to embodiments described herein comprised lofted non-woven synthetic fibers. This three dimensional platform adds a depth loading feature. Depth loading gives an air filter high airflow with low restriction while providing large dust holding capacities. The hybrid air filtration medium permits a low restriction air filter that could be cleaned almost anywhere and in anyway As shown in FIG. 5, the hybrid filter medium includes a thick lofted non-woven synthetic media. The material is pleated to increase the surface area available for passing contaminated air. A first layer 14 may be configured on the side directed toward the incoming air stream to be cleaned (i.e. the dirty incoming air flow), while a second material layer 15 may be positioned behind the first material layer toward the exit side of the air flow (i.e. the cleaned outgoing air flow). A third layer 16 may be on the air exit side of the second layer 15. The material of each of the layers may include a non-woven synthetic material to promote depth loading of the deposited particulate matter. The first layer 14 may then be lofted to help enhance the depth loading of the particulate material. The lofting may be achieved through pricking, pulling, or otherwise separating fibers of the first layer. The first layer 14 may be very course to capture larger particulate material. As the air flow penetrates deeper into the media, the material may become increasingly finer to capture increasingly smaller particulate. Therefore, for example, the material of the third layer 16 may comprise finer separation distances between fibers than that of the first layer 14. The coarseness of the material may be constant for a given layer, or may gradually increase or decrease across the one or more layers.

These commercial grade air filters built from a new hybrid filter medium incorporates some of the best characteristics of both cotton and synthetic non-woven technologies. They do not require any oil treatment and use a 3-D lofted filter surface to help reduce air filter restriction while increasing dirt capacity. Less restriction means more power and better engine efficiency. As air filter restriction goes up, an engine needs to expend energy "pulling" air through the filter. This is wasted energy that is no longer available for power at the wheels. Another air flow benefit is achieve each time the air filter is washed, restriction is reduced whereas disposable air filters slowly increase in restriction throughout their service life.

Additional reinforcement may be included to provide additional strength and durability for reusable applications. Therefore, the filter may be cleaned and reused instead of being discarded after each application. For example, the air filter media 12 may be positioned between one or more layers of a reinforcing layer. As shown, a wire screen 18 may be used on an outer and inner surface of the filter media. The wire screen may be a powder-coated aluminum screen wire that is co-pleated along with the filter medium to reinforce the media material. Additional or alternate reinforcement may be provided, for example, by an exterior and/or interior cage 20 surrounding the filter media. For example, a criss-crossed steel cage may provide additional reinforcement for the filter media on an interior and exterior surface of the filter. The reinforced medium surrounded by a powder-coated steel cage may withstand the extreme temperatures and pressures that can be present in large turbo diesel applications. The strong and robust reinforced medium may permit the air filter to be used multiple times. For example, the air filter according to embodiments described herein may be used in place of up to 10 or more disposable air filters.

The air filter medium may be selected or configured to provide reversible air flow or uni-directional air flow through the filter. In an exemplary embodiment, the first layer 14 is positioned on an interior side of another third material layer 16 so that the dirty air enters from an end and fills the interior cavity, travels across the filter material from an interior surface to an exterior surface and away from the filter. The material configuration may be reversed for reverse flow, or may be symmetric or mirrored to provide reversible air flow through the filter.

The reinforced medium 12 including an interior and exterior steel cage 20 is then held between end caps 22 and 24. The end caps may be either rubber or plastic or other resilient or deformable material that is sufficiently strong to support the filter. For example, one or both of the end caps may be molded urethane, foam urethane, or an polyurethane elastomer, and/or may include a steel, or aluminum infrastructure. In the exemplary embodiment shown, a elastomer molded polyurethane is used to provide an additional hardness and robust exterior seat for the filter medium. For reusable filters, the molded elastomer is preferable over foam to reduce degradation during the cleaning process.

The first end cap 22 and/or second end cap 24 may be configured to mate with a corresponding surface of an air flow housing to secure the filter relative to the housing. As the air is directed through filter area 4, to increase air flow and improve performance, the space around the filter to the housing should be maintained. The filter is therefore positioned within the housing to maximize the airflow and the end caps are configured to retain the filter in the desired location.

The first end cap 22 is configured to frictionally engage an inserted air conduit to seal the conduit to the filter. The frictional engagement may be achieved through the deformation of a surface of the first end cap. The material of the end cap may be sufficiently strong to support the filter and generally maintain a given configuration, but may be sufficiently pliable that an surface may deform to conform to an inserted conduit. The end cap may therefore include a flange circumscribing an opening of the first end cap. An interior surface of the flange may radially expand to accommodate an inserted air flow conduit.

Figure 2:
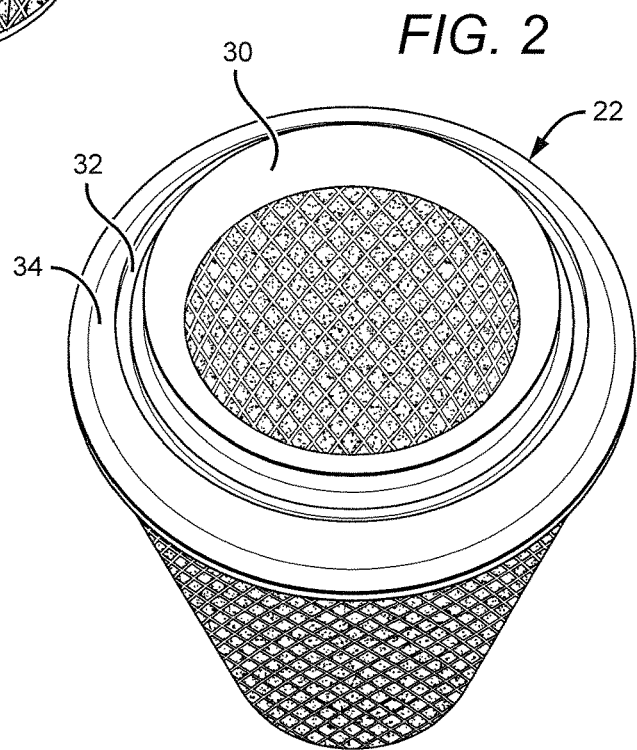
FIG. 2 illustrates a perspective view of a first end of the air filter according to embodiments described herein.

An exemplary first end cap 22, as illustrated in FIG. 2, includes a large circular opening 28 in its center. The opening is defined by a circular ridge or rim 30 projecting generally longitudinally away from the interior cavity 10 of the filter. The rim defines an opening to the interior of the filter. The interior surface of the rim 30 may be reverse tapered such that it is widest at an exterior edge and continuously decreases in diameter toward an interior of the filter. The funnel or conical shaped interior surface can be used to direct incoming air flow from an attached conduit. The reverse taper may be gradual along a length. The taper may be linear or arcuate. As shown, the reduced diameter transition is convex arcuate, such that the taper is greatest near an outer edge of the projection and becomes increasingly diminished as the surface approaches the interior portion of the filter area. Thus, the opening slopes or tapers such that it narrows by a greater extent toward an exterior edge and continues to taper as it approaches the open interior of the filter media pack, but at a gradually decreasing amount. The first end cap opening provides access to the central open interior of the filter, and can be installed over an air inlet tube of a filter housing to allow air to flow into the interior of the filter. The exterior surface of the rim 30 is generally circular cylindrical, such that the outer profile of the rim 30 is generally constant along its longitudinal length.

In an exemplary embodiment, to accommodate an inserted surface associated with the filter housing, a recess 32 may circumferentially surround a base of the projection 30. The recess may be generally circular and be directly adjacent the rim 30. The recess is circumferentially defined on the interior side by the rim 30 and on an exterior side by a flange 34. The flange 34 may be shaped according to the housing and may provide an abutment surface to further seal and/or secure the filter to the housing. The flange 34 may longitudinally ends from an exterior terminal end of the end cap 22 and slightly radially inward. The transverse width of the flange may taper to a minimum diameter at the terminal end. The radially inward orientation of flange 34 may provide an inward frictional engagement with an inserted corresponding mating surface of the filter housing 26.

In an exemplary embodiment, the end caps are configured to frictionally engage an air filter housing 26. The engagement is also configured to seal the filter to the housing and prevent air from bypassing the filter area 4. The engagement may be ribbed, threaded, or otherwise provide a frictional, sealing engagement between the tube and filter. In an exemplary embodiment, the contour of the terminal end of the first end cap 22 may be configured to accommodate and mate with a corresponding contour of a filter housing. The end cap 22 radially seals the filter to a conduit of the air filter housing. The filter, such as rim 30 or flange 34 may deform to seal the filter housing against corresponding mating surfaces 36 and/or 38. The frictional engagement may be created through the compression or deformation of the material of the end cap to conform to a surface of the inserted filter housing.

A rim 30, recess 32, and flange 34 may be integrally formed and molded to the filter medium to securely retain the medium in place. The rim 30 or flange 34 or other surface of the end cap 22 may be used as a gasket to seal the filter to the housing and/or pipe. Therefore, additional components that may wear out or require replacement may be reduced or eliminated.

In an exemplary embodiment, the smallest diameter portion of the interior profile of the first end cap 22 is continuous with the interior of the filter area or interior cage 20, such that the diameter of the opening is the same as the diameter of the filter area. In an alternate embodiment, the diameter of the opening may be less than a diameter of the filter area. In either embodiment, the opening may comprise a ledge around the edge of the opening, such that the inside surface rises to form a narrow circular ridge that projects inwardly into the interior of the filter in the direction of the second end cap. The ridge of the inside surface may be used to prevent moisture from leaving the inside surface through the opening up to the height of the ridge. The ridge may be an projection into the interior opening. The ridge may be along only a portion of the filter or fully surround the opening. The ridge may project toward the opposing end, directly inward, or outward.

A second open end cap 24 is provided opposite the first end cap 22. The end cap forms a generally planar end. The planar end includes a flanged rim circumscribing the perimeter of the end. The flanged rim extends from the perimeter of the planar end radially outward and longitudinally away from the filter body, thus forming a generally frusto-conical rim around the circumference of the second end. A second generally annular rim 42 may circumscribe and define an interior opening through the second end. The interior rim 42 may generally project longitudinally to form a generally cylindrical projection. The interior surface 44 of the opening of the interior rim 42 may be reverse tapered so that along the projection the diameter increases from the opening through the planar end to a larger diameter at a terminal end of the rim. The taper may be linear or may be generally arcuate so that the taper is greater along a portion, such as for example an outer portion of the rim. The planar end cap may include one or more recesses 46 between the inner and outer rims. The interior surface 44 of the interior rim 42 may also include a ridge or projection 48 into the opening. This ridge 48 may be a generally annular ring on the tapered interior surface of the inner rim.

Figure 3A:
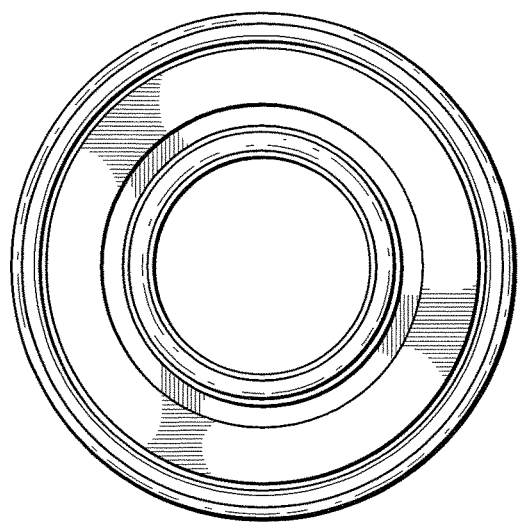
FIG. 3A illustrates an end plan view of the second end according to embodiments described herein.

The outside surface of the second end cap is shown in FIG. 3. The second end cap also includes a circular opening in its center that is defined by a circular projection or ridge. The circular projection defining the opening also tapers from a larger diameter at a longitudinal outer edge to a smaller diameter toward the center of the filter. The opening may be generally the same size as the inner diameter of the filter region. Preferably, the inner diameter of the opening along its entire length is smaller than the inner diameter of the filter region. As shown, the second end cap opening is smaller than the first end cap opening. Thus, the opening slopes or reverse tapers such that it narrows as it approaches the open interior of the filter media pack. There is also a small circular indentation to form a stepped ridge along the interior outer edge.

Figure 3B:
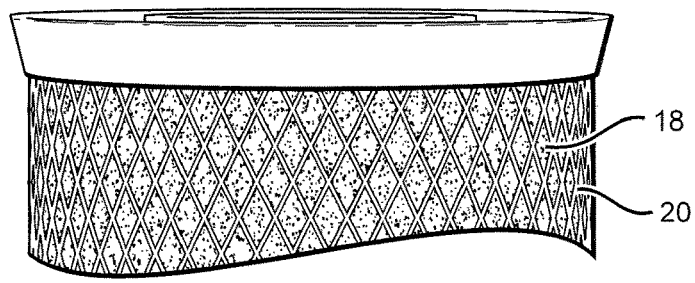
FIG. 3B illustrates a side view of the second end of FIG. 3A.

As can be seen in FIG. 3B, the outer rim of the end cap is formed by a circular projection or ridge that extends at an angle axially and radially outward from the filter region. The exterior outer profile along the longitudinal length of the outer rim of the end cap is generally truncated conical. For example, the region of the outer rim with the largest diameter is the region at the top of the circular projection or terminal end of the filter/end cap. The diameter tapers inwardly from the region at the top of the circular projection toward the filter media pack. Between the circular projection defining the opening and the outer rim of the second end cap is a relatively wide circular recess. The circular recess also includes two narrow circular trenches in the floor of the circular recess. Any number of recesses may be included, or may not be present at all.

The tapered interior surface of the first end cap can form a seal against a circular ridge on a cover of a filter housing. The filter housing 26 comprises a contoured end that mates with the second end cap 24. The filter housing 24 slopes outward to correspond and mate with the interior surface 44 of interior rim 42. The housing may include an indentation to mate with the projection 48 or may deform the projection such that the projection acts as a gasket in the seal between the filter and the housing. The interior rim 42 may deform in mating with the housing to create an air tight frictional seal between the housing and filter. The exterior rim 40 may similarly engage and or deform in contact with an interior surface of the housing to further seal and retain the filter in a desired configuration.

Figure 6:
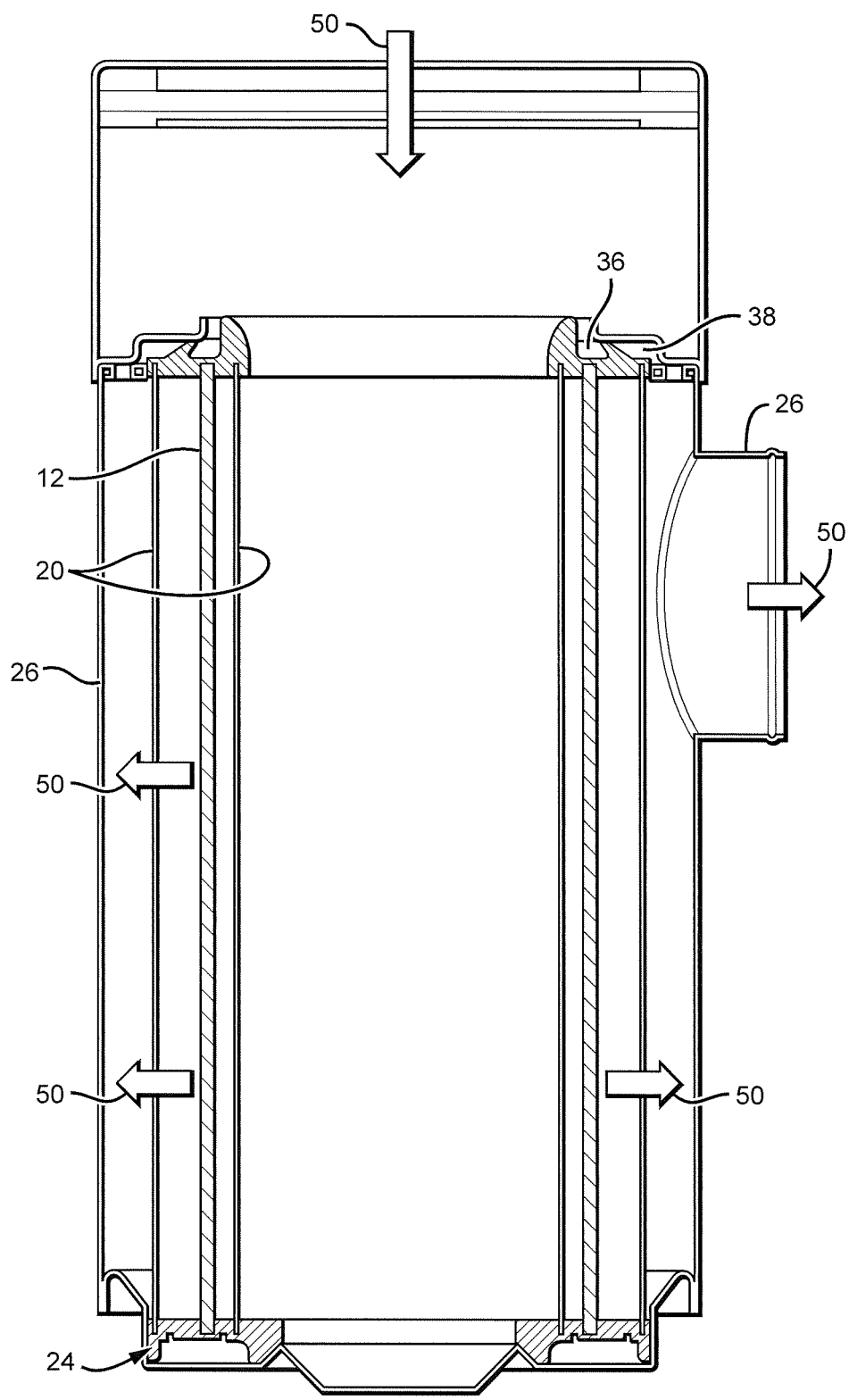
FIG. 6 illustrates a cross-sectional view of an exemplary air filter within a housing according to embodiments described herein.
Figure 7A:
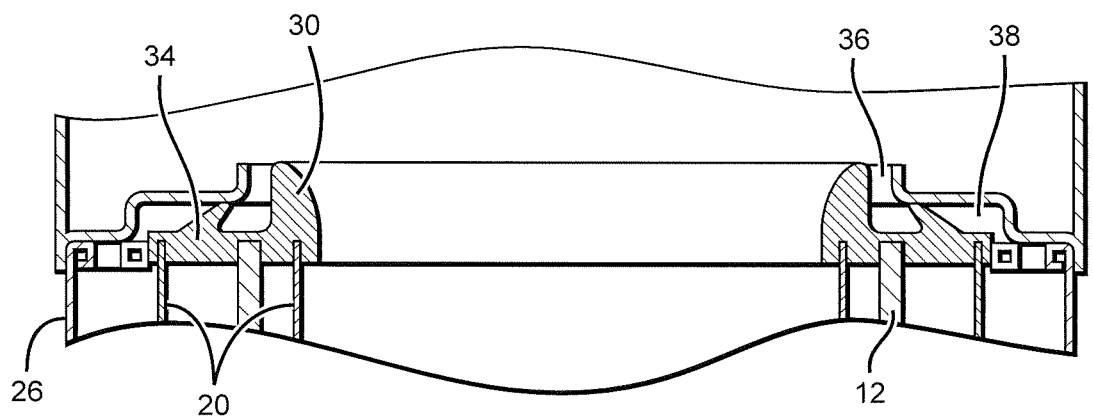
FIGS. 7A and 7B illustrate cross-sectional, blown up terminal ends of FIG. 6.
Figure 7B:
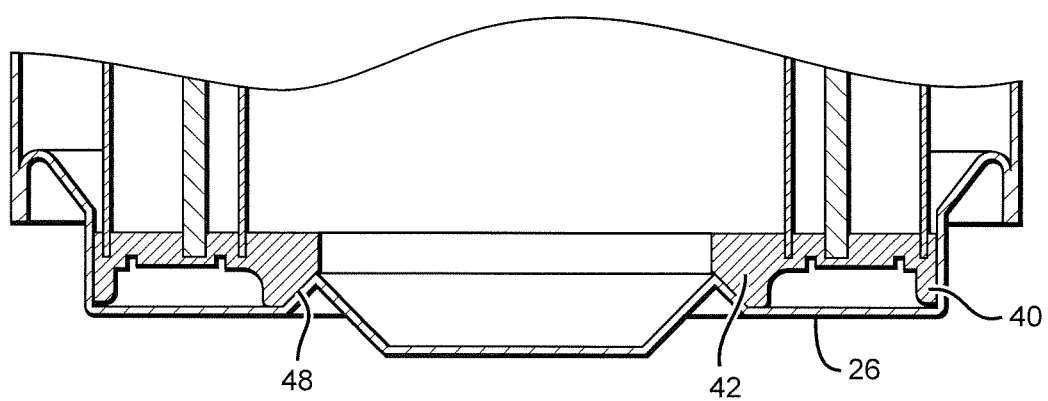

Thus, as seen in FIG. 6, when positioned in a filter housing 26, the filter 2 is sealed at opposing end caps. The housing at the second end cap 24 closes the open end of the filter, thus preventing air flow therethrough. Therefore, as shown by arrows 50, the air flows into the interior of the filter from the first end 6 through the filter area 4 and out a side conduit of the housing. A space is created between the filter and the housing to accommodate the air flow out of the filter and through the outlet conduit of the housing. The filter is maintained in the desired location through the frictional engagement of the end caps to the housing.

The air filters according to the embodiments described herein allow more air to pass through the filter while retaining the same filtering capabilities as conventional filters. This provides for additional power, especially at higher rpms.

In an exemplary embodiment, the circular projection of the first end cap 22 defining the opening tapers from a diameter of about 6 to 15 inches, and preferably approximately 8 to 10 inches, or 9 inches at its widest point to a diameter of about 3 to 12 inches, and preferably 6.5 to 8.5 inches, or 7.5 inches at its narrowest point. The narrow circular recess is about ⅓ to 1 inch, or ⅔ of an inch wide and has a diameter of between 7 and 13 inches or about 9 to 10.5 inches, r about 9.75 inches (as measured from the center of the circular recess). The narrowest portion of the opening of the first end cap 22 is nearly as large in diameter as the inner diameter of the filter media and inner liner. Accordingly, the inner surface of the first end cap (i.e., between the filter media and the opening) is very narrow (approximately under about ½ inches, or approximately about ¼ inch in width).

For the second end cap, the circular projection defining the opening tapers from a diameter of approximately 5 to 10 inches or approximately 7 to 8 inches, or about 7.5 inches at its widest point to a diameter of approximately 4 to 9 inches, or about 5 to 7 inches, or about 6 inches at its narrowest point. There is also a small circular ridge of about 6 to 7 inches or 6.5 inches in diameter along the taper of the circular projection. The circular recess is about 1.5 to 3.5 inches wise, or approximately 2.5 inches wide, has a diameter of about 8 to 12 inches, or approximately 10 inches (as measured from the center of the circular recess). The circular recess also includes two narrow circular trenches in the floor of the circular recess with diameters of, for example, about 8.75 inches and 11.5 inches respectively.

The material of the end caps is sufficiently hard to retain the filter media in the desired configured and support the filter when coupled to the filter housing. The material is also durable enough for repeated cleaning and use. However, the material provides some flexibility or give so that a frictional engagement may be achieved between the filter and the inserted pipe. The material therefore compresses when a mating surface of the filter housing contacts, abuts, or is inserted into contours of the filter end caps such that a sealed engagement is achieved between the housing and filter. The open end cap, integrated into the filter, therefore creates the attachment mechanism for the filter to the housing, the sealing mechanism, as well as the support for the filter media.

Embodiments as described herein are very robust, which means they are incredibly easy to clean. The filters may be cleaned with or without a degreasing agent, and pressure washed, compress air blown, or water sprayed to remove the built up particulate, including dirt and grime from the filter material. The potential reuse of the filter reduces the cost of replacing air filters. The depth-loading of the filter material may be washable. Because of the fitted end caps, the air filter is removable from the housing to permit replacement, servicing, and cleaning of the filter. Moreover, when restriction builds beyond a desired level, the filter may simply be washed. So instead of short cycling expensive disposable air filters, embodiments according to the present description keep restriction down and horsepower up.

It will be understood that the terms "top," "side," and "bottom" used herein are intended to provide a frame of reference for purposes of describing embodiments of the air filter. The actual orientation of the air filter in use and the direction of air flow may vary. In additional, the recitations to a first, second, or more components is intended not to require a specific number or location of a specific component, but merely used as a distinguishing reference from one component to another. Moreover, and feature of the present configuration may be duplicated, removed, moved, reconfigured in any combination with respect to any other feature, such that the exemplary embodiment including all of the described features and positions are not necessary.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

Thus, specific embodiments and applications of air filters have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C, . . . and N, the text should be interpreted as requiring only one element from the group, not A plus N, or B plus N, etc.

We claim:

1. An air filter, comprising:
   a first end cap at a first terminal end of the air filter, the first end cap having a first opening;
   a second end cap at a second terminal end of the air filter, the second end cap having a second opening, wherein the second end cap comprises an interior rim having a tapered interior surface, wherein the interior rim defines the second opening, and wherein the tapered interior surface includes a ridge configured to deform when the interior surface mates with an air filter housing; and
   a filter media coupled to the first end cap and the second end cap to circumferentially surround an interior cavity.

2. The air filter of claim 1, comprising a rim defining the first opening and extending longitudinally past an exterior terminal end of the first end cap.

3. The air filter of claim 2, wherein an interior surface of the rim defining the first opening is tapered such that an interior diameter at a terminal edge of the end cap away from the filter media is greater than an interior diameter along the interior surface away from the terminal edge.

4. The air filter of claim 3, wherein the tapered interior surface is accurate.

5. The air filter of claim 2, further comprising a flange circumferentially surrounding a longitudinal portion of the rim extending longitudinally past a terminal end of an exterior perimeter of the first end cap.

6. The air filter of claim 5, wherein the flange projects radially inwardly.

7. The air filter of claim 1, wherein the second end cap comprises an interior rim defining the second opening and projecting longitudinally outwardly from an terminal end of a portion of the second end cap.

8. The air filter of claim 7, wherein the second end cap comprises an exterior rim defining an exterior perimeter of the second end projecting longitudinally outward from the terminal end of the portion of the second end cap, such that a radial gap separates the interior rim from the exterior rim.

9. The air filter of claim 8, wherein an interior surface of the interior rim comprises a circumferential ridge around the first opening.

10. The air filter of claim 8, wherein a material of the first end is configured to deform when mated with a filter housing.

11. That air filter of claim 8, wherein a material of the second end is configured to deform when mated with a filter housing.

12. The air filter of claim 1, wherein the interior cavity has a larger diameter than the first opening.

13. The air filter of claim 1, further comprising a rim defining the first opening and extending longitudinally past an exterior terminal end of the first end cap.

14. The air filter of claim 1, wherein a rim of the first opening is tapered such that an interior diameter at a terminal edge of the end cap away from the filter media is greater than an interior diameter along the interior surface away from the terminal edge.

15. The air filter of claim 1, further comprising:
   a flange extending away from the first opening of the first end cap of the air filter.

16. The air filter of claim 15, wherein the flange projects radially inwardly.

17. The air filter of claim 1, wherein the second end cap comprises an interior rim defining the second opening and projecting longitudinally outwardly from an terminal end of a portion of the second end cap.

18. The air filter of claim 17, wherein the second end cap comprises an exterior rim defining an exterior perimeter of the second end projecting longitudinally outward from the terminal end of the portion of the second end cap, such that a radial gap separates the interior rim from the exterior rim.

19. The air filter of claim 18, wherein an interior surface of the interior rim comprises a ridge around the first opening.

20. The air filter of claim 18, wherein a material of the first end is configured to deform when mated with a filter housing.

21. That air filter of claim 18, wherein a material of the second end is configured to deform when mated with a filter housing.

22. The air filter of claim 1, wherein the material of the air filter media is different from the material for the first end cap and the second end cap.

* * * * *